(12) United States Patent
Ulichney

(10) Patent No.: US 8,634,110 B2
(45) Date of Patent: Jan. 21, 2014

(54) EDGE REFINEMENT SYSTEM

(75) Inventor: Robert Alan Ulichney, Stow, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 464 days.

(21) Appl. No.: 12/899,476

(22) Filed: Oct. 6, 2010

(65) Prior Publication Data

US 2012/0086984 A1     Apr. 12, 2012

(51) Int. Cl.
*H04N 1/40*     (2006.01)

(52) U.S. Cl.
USPC ........... 358/3.28; 358/1.9; 358/2.1; 358/3.06; 358/3.27; 382/100

(58) Field of Classification Search
USPC ............ 358/1.9, 3.03–3.06, 3.26–3.28, 358/533–536; 382/100, 254–269
See application file for complete search history.

(56) References Cited

U.S. PATENT DOCUMENTS

| | | | | |
|---|---|---|---|---|
| 5,268,967 | A * | 12/1993 | Jang et al. | 382/132 |
| 5,710,827 | A | 1/1998 | Perumal, Jr. et al. | |
| 5,734,752 | A * | 3/1998 | Knox | 358/3.28 |
| 6,690,389 | B2 | 2/2004 | Ulichney | |
| 6,760,464 | B2 * | 7/2004 | Brunk | 382/100 |
| 6,804,373 | B1 * | 10/2004 | Tresser et al. | 382/100 |
| 7,034,955 | B2 | 4/2006 | Bearss et al. | |
| 7,528,993 | B2 * | 5/2009 | Rosen | 358/3.28 |
| 7,925,045 | B2 * | 4/2011 | Zhao et al. | 382/100 |
| 8,280,100 | B2 * | 10/2012 | Kihara | 382/100 |
| 8,373,895 | B2 * | 2/2013 | Fan et al. | 358/1.9 |
| 2004/0179239 | A1 * | 9/2004 | Yamazaki et al. | 358/2.1 |
| 2006/0204032 | A1 * | 9/2006 | Nakamura et al. | 382/100 |
| 2007/0242288 | A1 * | 10/2007 | Fan | 358/1.9 |
| 2009/0103140 | A1 * | 4/2009 | Yamamoto | 358/3.09 |

OTHER PUBLICATIONS

Pei, et al., "Novel Robust Watermarking Technique in Dithering Halftone Images", IEEE Signal Processing Letters, vol. 12, No. 4, Apr. 2005, pp. 333-336.

Chiang et al. Printer and Scanner Forensics, IEEE Signal Processing Magazine, Mar. 2009, pp. 72-83.

* cited by examiner

*Primary Examiner* — Richard Zhu

(57) ABSTRACT

An edge refinement system includes a computer-readable medium encoded with a computer program having computer readable code for identifying carrier cells among shadow cells and highlight cells of a segmented image, computer readable code for determining if a predetermined edge condition is met by each of the identified carrier cells, and computer readable code for re-classifying the carrier cell as a non-carrier cell when the predetermined edge condition is met. The edge refinement system further includes memory and a processor operatively coupled to the memory and to the computer-readable medium.

15 Claims, 7 Drawing Sheets

Bank of Stegatonia

Fig-3

| 14 | 12 | 16 | 20 | 49 | 51 | 47 | 43 |
|----|----|----|----|----|----|----|----|
| 10 | 0  | 2  | 18 | 53 | 63 | 61 | 45 |
| 8  | 6  | 4  | 22 | 55 | 57 | 59 | 41 |
| 30 | 26 | 24 | 28 | 33 | 37 | 39 | 35 |
| 48 | 50 | 46 | 42 | 15 | 13 | 17 | 21 |
| 52 | 62 | 60 | 44 | 11 | 1  | 3  | 19 |
| 54 | 56 | 58 | 40 | 9  | 7  | 5  | 23 |
| 32 | 36 | 38 | 34 | 31 | 27 | 25 | 29 |

Fig-4

| 58  | 50  | 66  | 82  | 198 | 206 | 190 | 174 |
|-----|-----|-----|-----|-----|-----|-----|-----|
| 42  | 2   | 10  | 74  | 214 | 254 | 246 | 182 |
| 34  | 26  | 18  | 90  | 222 | 230 | 238 | 166 |
| 122 | 106 | 98  | 114 | 134 | 150 | 158 | 142 |
| 194 | 202 | 186 | 170 | 62  | 54  | 70  | 86  |
| 210 | 250 | 242 | 178 | 46  | 6   | 14  | 78  |
| 218 | 226 | 234 | 162 | 38  | 30  | 22  | 94  |
| 130 | 146 | 154 | 138 | 126 | 110 | 102 | 118 |

Fig-10

EDGE REFINEMENT SYSTEM

BACKGROUND

The present disclosure relates generally to an edge refinement system.

Barcodes are a popular means for encoding information in printed matter; however, they are overt and often unsightly. If an image is to be a part of the composition of the printed label or page, a viable alternate to using a barcode is to hide information in the image. It has been found that information may be encoded in the halftone of an image, using techniques such as cluster-dot halftoning. The process takes any grayscale image and a payload of data to be encoded therein as input, and produces a bitonal clustered-dot halftone of that image with selected halftone clusters shifted to carry a varying number of bits from the payload. The result is a data-bearing steganographic halftone (i.e., stegatone). The small size and large number of clustered-dot cells in printed halftones allow the printer/encoded bit density to be quite high, typically over 2000 bytes/square-inch. The carrier cells of the data-bearing steganographic halftone are forced to be a uniform shape to allow for reliable recovery of the shift information. This is accomplished by setting all pixel values to the average value of pixels in that cell. As such, carrier cells sacrifice some detail rendition in favor of storing recoverable data. In contrast, non-data carrying cells are not flattened, and thus retain as much detail as possible in the final rendering of the image.

BRIEF DESCRIPTION OF THE DRAWINGS

Features and advantages of examples of embodiments of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIG. 3 is an embodiment of a dither template for use in clustered-dot halftoning;

FIG. 4 is an embodiment of a threshold array based on the dither template of FIG. 2;

FIG. 10 is an enlarged portion of a data-bearing halftone image formed using the image of FIG. 2, and with edge refinement including a range test with the threshold set at 0.06.

DETAILED DESCRIPTION

Figure 8:
FIG. 8 is an enlarged portion of a comparative data-bearing halftone image formed using the image of FIG. 2, and without edge refinement.

Embodiments of the edge refinement system disclosed herein are capable of removing satellite clusters (i.e., which appear as dots or other marks that are floating outside the outline of a graphical object, see, e.g., reference character "SC" in FIG. 8) around at least some of the edges of data-bearing halftone images. In one embodiment, the edge refinement system is part of a system that is used for the creation of the data-bearing halftone images. The data-bearing halftone images can be generated using images that include text, solid background, and/or synthetic graphics (e.g., company logos), and/or that are photographically acquired. The methods utilized by the edge refinement system to remove satellite clusters advantageously balance desired aesthetics for the resulting data-bearing halftone image with the desired carrying capacity of the resulting data-bearing halftone image.

Figures 1, 2:
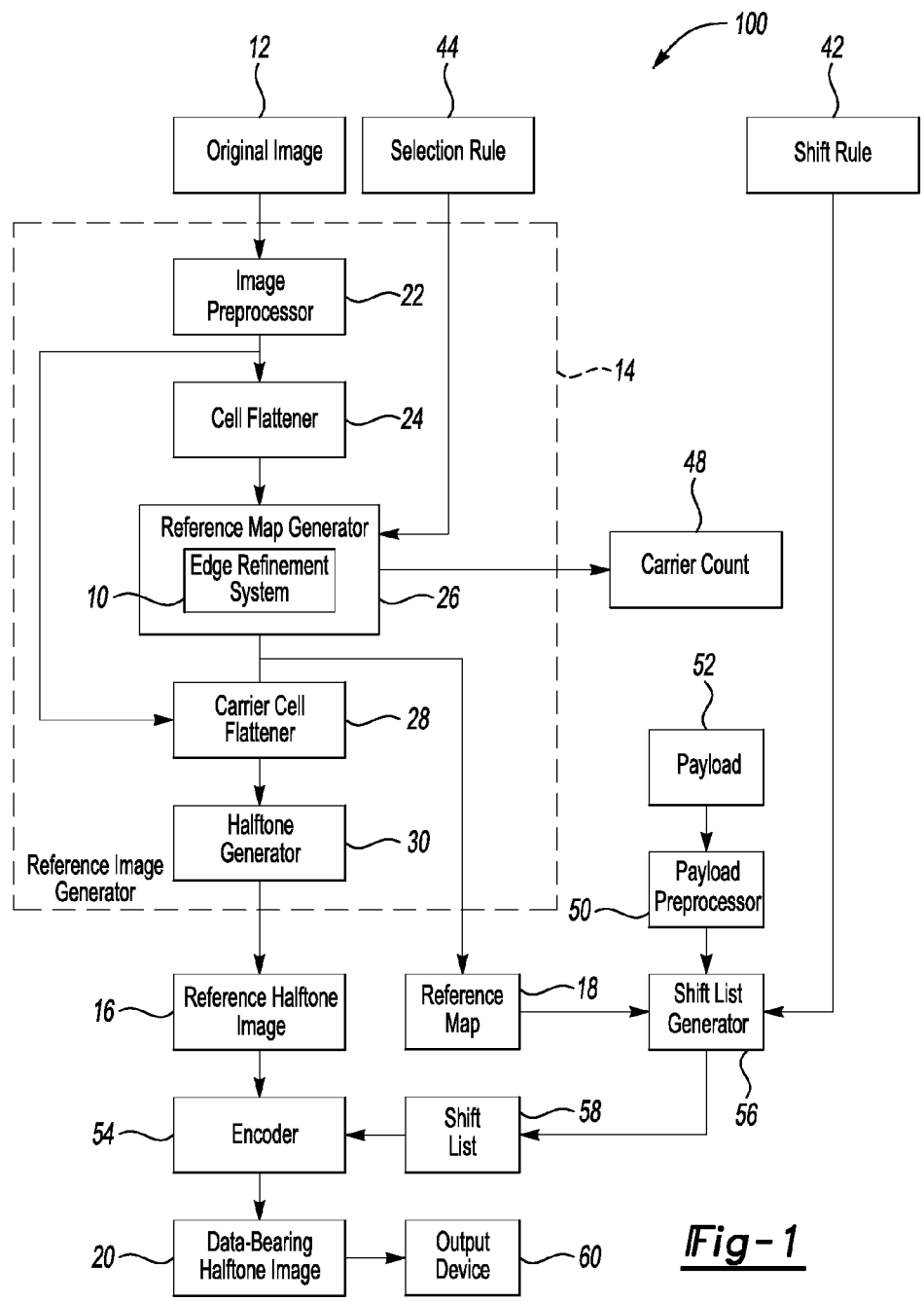
FIG. 1 is a schematic diagram of an embodiment of a system for creating a data-bearing halftone image.
FIG. 2 is an embodiment of an image that includes text on a white background.

An embodiment of a system 100 for creating a data-bearing halftone image with refined edges is illustrated in FIG. 1. Very generally, the system 100 includes various sub-systems and/or components (each of which will be described further herein) for performing one or more of the method steps. The overall system 100 may include a network of interconnected computers and/or other electronic devices (e.g., scanners, printers, etc.), including virtualized and/or redundant processors, banks of processors and/or servers, etc. It is to be understood that the components of the system 100 may be implemented in a consolidated location, or portion(s) of the system 100 may be implemented at different locations.

The hardware of at least some of the sub-systems includes an electronic processing device, such as, for example, a controller, a micro controller, a microprocessor, a host processor, an application specific integrated circuit (ASIC), and/or a reprogrammable hardware logic device (such as a field programmable gate array (FPGA)). It is to be understood that the electronic processing device may be a processor working in conjunction with a central processing unit (CPU) performing the function of a general-purpose processor. Computer program(s) and/or software (e.g., including computer readable codes) may be loaded onto one or more of the sub-systems, and stored in a memory thereof. Such programs and/or software are executable via a processing device.

In the embodiment of the system shown in FIG. 1, an original (or input) image 12 (from which the data-bearing halftone image is created) is input into the system 100. The image 12 is input into the reference image generator 14. It is to be understood that the original image 12 may be any grayscale image including photographs, graphics, text, or a constant area, such as the background of a page. One non-limiting example of an original image 12 is a company logo consisting of dark gray or black text on a white background, which is shown in FIG. 2.

In this embodiment, the original image 12 is processed using the reference image generator 14 to create a reference halftone image 16 and a corresponding reference map 18 that are used to create the data-bearing halftone image 20 with refined edges. In one embodiment, the reference image generator 14 is a printer controller or a component thereof. The reference image generator 14 is a sub-system of the system 100, which includes an image preprocessor 22, a cell flattener 24, a reference map generator 26 (including edge refinement system 10), a carrier cell flattener 28, and a halftone generator 30.

Prior to describing the reference image generator 14, a discussion of halftoning is deemed useful. Halftoning refers to any process that creates the illusion of continuous-tone images by the arrangement of binary picture elements, such as ink drops. In one embodiment, halftoning is printing the simulation of a continuous-tone image, such as the original images described above, with groups or cells of color or black dots. The placement of the dots appears to the human eye to be a single color. In one embodiment, digital halftoning is called spatial dithering. In another embodiment, spatial dithering is a subset of digital halftoning.

An ordered dither consists of turning on the output bit for a pixel if the intensity level is greater than the threshold of a particular matrix element at that pixel position. Ordered dithering of images can employ clustered-dot and dispersed-dot methods. Clustered-dot halftoning generates dots in "clustered" patterns. In other words, as input intensity increases, new pixels intensified in each pattern are placed adjacent to already-intensified pixels. Clustered-dot halftoning is often used in both dry toner and liquid toner electrophotographic processes, at least in part because they produce dots that are quite stable (i.e., less susceptible to errors and data loss than dispersed-dot techniques). The use of any of the clustered-dot algorithms known in the art are contemplated for use with the present embodiments.

The nature of any ordered dither is dictated by a deterministic, periodic array of threshold values. Ordered dithering employs a dither matrix, which is an array of integer threshold values, to produce the shaded output image. The dither matrix is commonly smaller than the input image, and therefore is repeatedly tiled over the input image. Each color value of the input image is compared against a dither matrix threshold value. When the input value is greater than the threshold value, the output pixel is turned "on". Conversely, if the input value of the pixel is less than or equal to the threshold value, the output pixel is turned "off". It is to be understood that the output described by the relative terms "on" and "off" will depend on the output device. For example, turning "on" a pixel of a halftone display can refer to the pixel going from black to white. However, printing the image with a printer could involve a reversal, in which black pixels represent actual output (i.e. the printing of a dot of black ink). The dither matrix thresholds essentially determine which pixels of the original image are displayed on the output device, and thus the ordering of the threshold values in the dither matrix affects the quality of the output image.

For clustered-dot halftoning, the thresholds are arranged so that output pixels will form ever-increasing white cluster sizes as input values increase from full black, and then ever-decreasing black cluster sizes as input values further increase to full white. The rule or order of thresholds is specified by a dither matrix or dither template. An example of a dither template 32 is shown in FIG. 3. This template 32 comprises an 8×8 matrix of pixel positions 34 with values from 0 to 63 that define the order that pixels will be turned "on" or "white". This arrangement forms a 45-degree screen. The 4×4 submatrices defined by the outlined boxes represent shadow cells 36, and the unboxed 4×4 submatrices represent highlight cells 38. The two cell types are also distinguishable by the spatial arrangement of pixel activation order. Shadow cells 36 produce patterns that manifest as white clusters surrounded by black (i.e., pixels are activated centrally first then progressively to the edges). Highlight cells 38 produce patterns that manifest as black clusters surrounded by white (i.e., pixels are activated first on the edge and then progressively centerward).

The actual threshold values that are to be used to compare against 8-bit input pixel values can be normalized. This may be accomplished to align the mean input intensity with the range of thresholds, or to scale the input range to the threshold range. As such, the most possible threshold values can be utilized in the dither template 32. Known approaches to normalization may be used. One mean-preserving relationship that can be used to scale the template values T[x,y] to threshold array values A[x,y] is:

$$A[x,y]=255-\text{int}\{(255/64)(T[x,y]+\tfrac{1}{2})\}$$ [Equation 1]

The resulting normalized threshold array 40 is shown in FIG. 4. A halftoning algorithm uses this array to compare with an input pixel $I_i$ to binarize the output pixel $I_o$ as follows:

$$\text{if } I_i \geq A[x,y] I_o=1; \text{ else } I_o=0$$ [Equation 2]

Figure 5A:
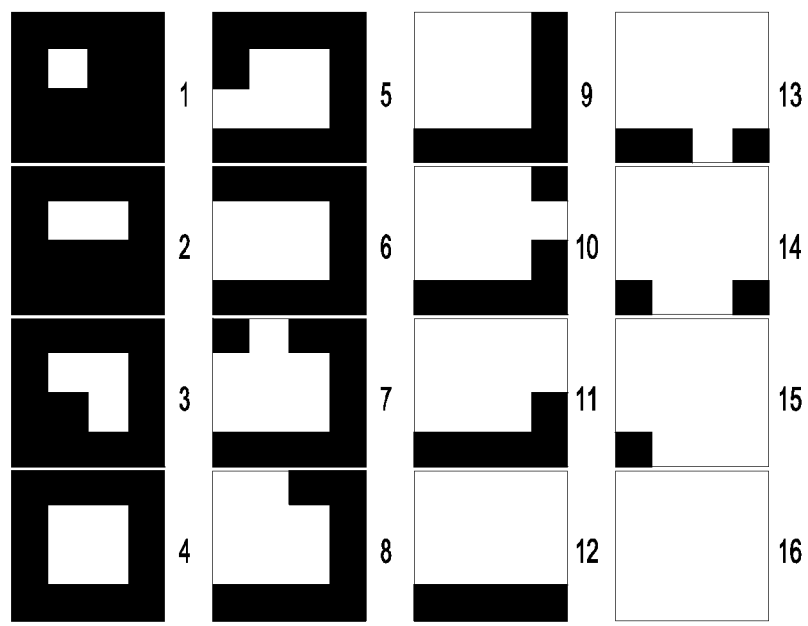
FIGS. 5A and 5B are schematic diagrams illustrating a change in cluster shape with increasing cluster size in highlight cells (FIG. 5A) and shadow cells (FIG. 5B) rendered using the dither template of FIG. 3.
Figure 5B:
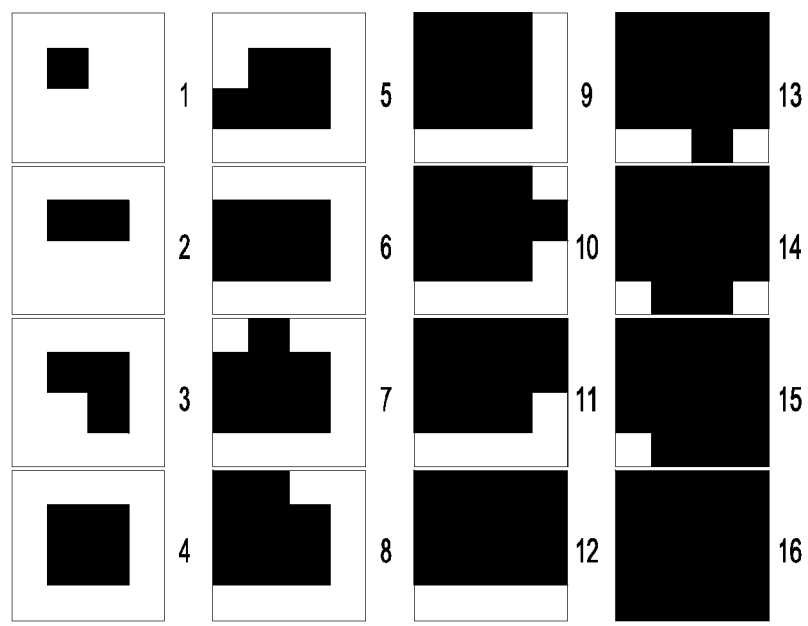

Using this array to halftone an input original image 12 that includes a folded grayscale ramp produces an image where the shadow cells 36 are illustrated with white "holes" and highlight cells 38 are illustrated with black clusters. The 4×4 highlight cells 38 take on the shapes shown in FIG. 5A. With increasing input intensity, additional pixels are printed (or omitted), causing the cluster to grow. In FIG. 5A, the number of white pixels that make up the center cluster is indicated next to the cell. Likewise, FIG. 5B illustrates cluster growth in the sixteen possible shadow cells 36. Like FIG. 5A, the number of black pixels making up the respective clusters is identified next to the cell. The cell shapes shown are dictated by the specification of the dither template 32 in FIG. 3. It is to be understood that a differently patterned template would result in a different pattern of cluster growth. It is to be further understood that any dither template arrangement suited for producing clustered-dot patterns may be used in the embodiments disclosed herein.

The progression of cluster shapes arising from a dither template 32 is used to render constant areas of the input original image 12. High-frequency detail (e.g., edges) can pass through a dither cell intact, i.e., the shape of the cell will reflect the detail shape, rather than an intensity-dependent cluster. Deviations of these cell shapes in response to such detail are referred to as "partial dots". As a result, the halftoned image more accurately preserves edges and details so as to provide a more accurate rendition of the continuous-tone, original image 12. As will be discussed further hereinbelow, the edge refinement system 10 disclosed herein processes the image 12 to further refine and preserve sharp edges that may otherwise result in the formation of satellite clusters in the data-bearing halftone image 20.

Information can be embedded into a subset of the rendered cells by encoding the information as single pixel shifts of the clusters within each cell. Not all cell shapes will afford their clusters the same degree of freedom to move. Cells that have room for a cluster to move to at least 2 single pixel shift positions can encode at least one bit of data, and therefore can be defined as "carrier cells". For example, cells 1 through 9 in both FIGS. 5A and 5B are potential carrier cells.

Figure 6:
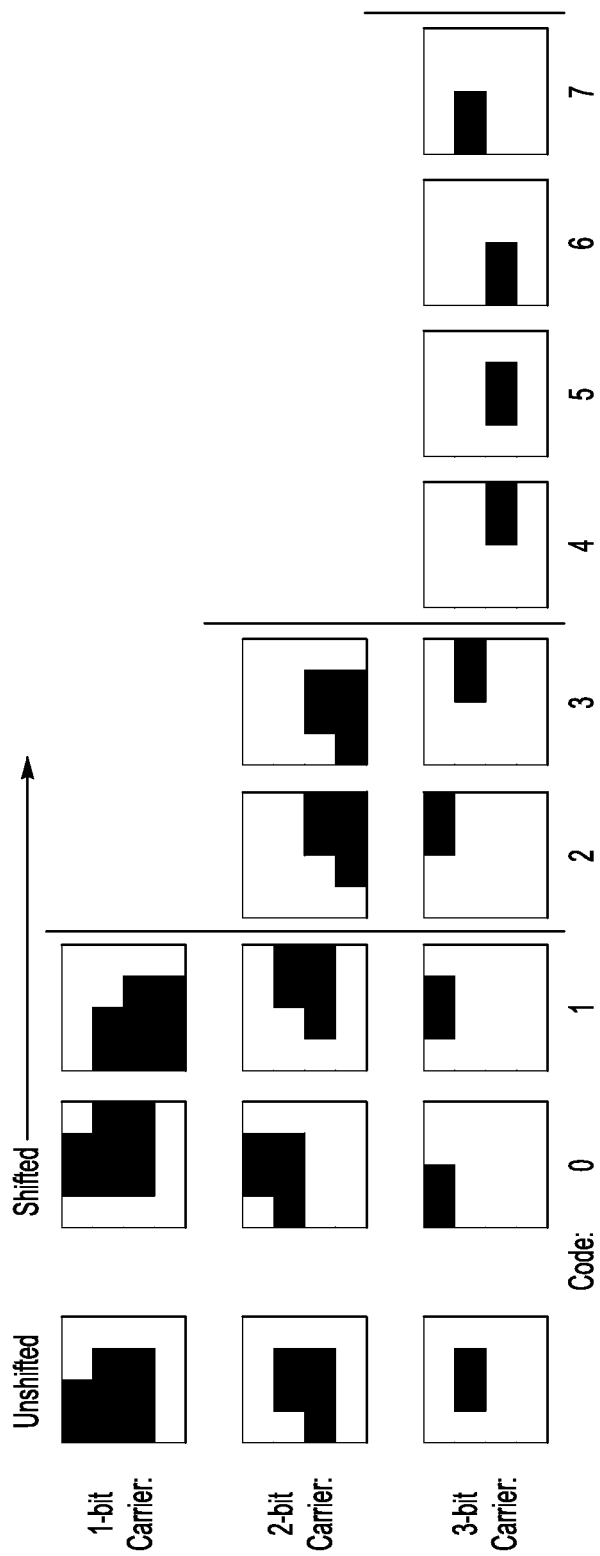
FIG. 6 is a diagram illustrating available shift positions and corresponding codes for three different examples of shadow cells.

More available shift positions in a shape means that more bits can be encoded in the cell. Cells 1 through 4 in FIGS. 5A through 5B can move to all eight surrounding positions, and can thus carry three bits. Cells 5 and 6 in FIGS. 5A and 5B can move to five positions, four of which can be used to encode 2 bits. Cells 7, 8 and 9 can move to three positions, and thus can carry 1 bit. FIG. 6 illustrates this principle for example 1-bit, 2-bit and 3-bit shadow cells.

The mapping of 1-bit, 2-bit, and 3-bit codes to shift positions can be defined by a shift rule 42. A non-limiting example of a shift rule 42 is illustrated below.

1-bit carrier

| X | X | x |
|---|---|---|
| X | C | 0 |
| X | 1 | x |

2-bit carrier

| X | 0 | x |
|---|---|---|
| X | C | 1 |
| X | 3 | 2 |

3-bit carrier

| 0 | 1 | 2 |
|---|---|---|
| 7 | C | 3 |
| 6 | 5 | 4 |

Example Shift Rule

In this example shift rule 42, the unshifted position is shown in the center C of each 3×3 array, with the remainder of the array including putative shift positions. An entry of "x" is used to indicate shift positions that are not used, and entries of 0, 1, 2, etc. indicate the shift position of a code of that particular value. For example, for the 1-bit carrier shift rule embedding a code of "0" will cause a shift right by 1 pixel while embedding a code of "1" will cause a shift down by 1 pixel. It is to be understood that other shift rules 42 may be used in accordance with the embodiments disclosed herein.

Unshifted carrier cells may be used as marker cells to communicate special signals to the system 100. As one example, marker cells may represent an unshifted carrier cell that is used to indicate a separation between the end and beginning of repeated sequences of the raw payload. As another example, a particular number of consecutive marker cells may be used to indicate the separation between repeating streams of payload bits.

A carrier selection rule 44 can be employed to specify which carrier cells and shift positions will be used for data encoding. The carrier selection rule 44 can be specific to a particular type of target device, to a particular category within that type, or even to a specific device. Table 1 below illustrates an example of a selection rule specification, in which each cluster size is either accorded a bit value (1, 2, or 3) or designated as a non-carrier (0).

TABLE 1

| Highlight Cells | | Shadow Cells | |
|---|---|---|---|
| Size | Bits | Size | Bits |
| 1 | 3 | 1 | 0 |
| 2 | 3 | 2 | 0 |
| 3 | 3 | 3 | 0 |
| 4 | 3 | 4 | 3 |
| 5 | 2 | 5 | 2 |
| 6 | 2 | 6 | 2 |
| 7 | 1 | 7 | 1 |
| 8 | 1 | 8 | 1 |
| 9 | 1 | 9 | 1 |

TABLE 1-continued

| Highlight Cells | | Shadow Cells | |
|---|---|---|---|
| Size | Bits | Size | Bits |
| 10 | 0 | 10 | 0 |
| 11 | 0 | 11 | 0 |
| 12 | 0 | 12 | 0 |
| 13 | 0 | 13 | 0 |
| 14 | 0 | 14 | 0 |
| 15 | 0 | 15 | 0 |
| 16 | 0 | 16 | 0 |

In this table, a value of zero bits indicates that that cell type is a non-carrier. In the example shown, the selection rule specifies that all potential highlight cells are useable with their maximum bit capacity, while the smallest shadow cells (e.g., 1, 2, and 3) are deemed non-carriers. This determination may be made based on the limitations of a target device. For example, the small white dots associated with shadow cells 1, 2 and 3 may not be produced reliably enough by certain printers due to dot gain in surrounding pixels. Accordingly, in one aspect of the embodiment, an encoding system is designed with particular known output and the recovery device in mind. A selection rule 44 is used that provides for carrier cells that are rendered robustly in the data-bearing output and/or are reliably detected by a recovery device.

After carrier selection, a number of non-carrier cells may remain. As discussed above, these can include cells having partial dots due to edges or other details in the image, as well as potential carrier cells that are excluded by the selection rule 44.

The reference image generator 14 of FIG. 1 utilizes the original input image 12 to generate the reference halftone image 18 and the reference map 20, which are used to provide the data-bearing halftone image 20.

Processes typically associated with preparing an image for printing can be performed by the image preprocessor 22. In one embodiment, these processes include decompression of the original image 12, adjusting the image histogram to accommodate non-linearity in the input-to-hardcopy print process, and scaling the image 12 to the device resolution of the printer. These processes are examples of preprocessing for rendering, and are not intended to be limiting. It is to be understood that other processes that are associated with rendering images in a given target device may also be included in the image preprocessor 22.

The reference image generator 14 also includes a cell flattener 24. Flattening of the cells in the image facilitates the detection and selection of potential carrier cells. The original image 12 is segmented into blocks that correspond to halftone cluster locations. The cell flattener 24 sets all of the pixels in each block to a single representative value (e.g., the average of the input therein). In the examples illustrated herein, in which halftone cells include 4×4 pixels, the cells have all 16 pixels temporarily set to a value equal to their average by the cell flattener 24. As a result, this flattened image is one-fourth the size of the original image 12 in each dimension.

The flattened image and the carrier selection rule 44 are transmitted to the reference map generator 26, which classifies all cells in the image as either carrier cells or non-carrier (reference) cells. This classification is based on the projected size of the resulting halftone cluster as determined by the flattened or average value of the cell, and the number of carrier bits for that cell size as specified in the carrier selection rule 44. 0 carrier bits are assigned to non-carrier or reference cells, and 1, 2, or 3 bits are assigned to carrier cells. The edge refinement system 10 then analyzes the identified carrier cells to potentially re-classify one or more of the carrier cells in order to improve the edge quality in the resulting data-bearing halftone image 20. It is to be understood that the reference map generator 26, which includes the edge refinement system 10, may use computer readable medium with one or more programs having computer readable code for performing various operations. The reference map generator 26 and/or the reference image generator 14 may include the memory upon which the program(s) is/are stored and may also include the processor that runs the program(s).

In order to properly assess the data capacity of the data-bearing halftone image 20, a reference map 18 of the original image 12 is generated by the reference map generator 26. This map 18 is the product of an analysis of the image 12, where the analysis involves an inventory of available carrier cells. In this process, the flattened image (now segmented into cells and flattened so that each cell holds a single average value) is assessed using the carrier selection rule 44. More particularly, each cell is assessed based on its value to determine whether the resulting halftone cluster will exhibit a shape that is useful for encoding data.

The reference map 18 can then be populated according to carrier selection rule(s) 44. Each highlight cell and shadow cell can be halftoned according to the applicable equation (e.g., Equation 2), and the cluster size can be determined by counting the number of pixels having a value of 1. A table can be generated in which each possible input value (e.g., 0 to 255 for the 8-bit example) is mapped to a cell size. The number of bits corresponding to each cell size is provided by the corresponding carrier selection rule 44 (i.e., for highlight cells or for shadow cells). The resulting reference map 18 specifies all of the locations in which payload data can be encoded and the amount of data each location can hold. The reference map 18 can present this information alphanumerically, e.g., in the form of a table, or graphically. In another embodiment, the reference map 18 can be a depiction of the segmented image in which all of the cells are shown with a code signifying their status (carrier or non-carrier) and data capacity.

Figure 7:
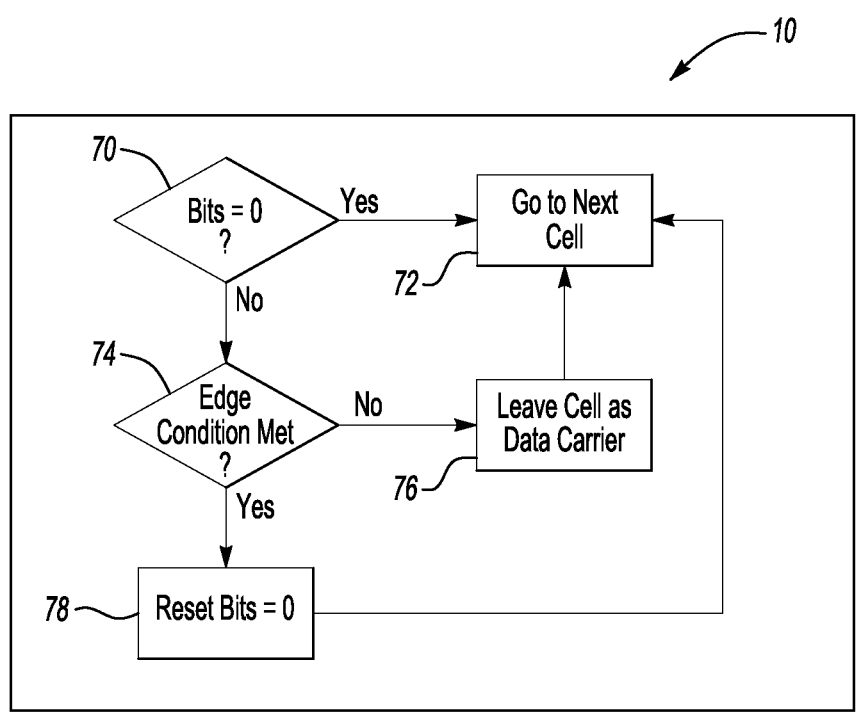
FIG. 7 is a schematic diagram of an embodiment of an edge refinement system.

After the flattened image 12 is segmented and the number of bits capable of being carrier by each cell is determined, the edge refinement system 10 analyses the carrier cells. An example of the process performed by the edge refinement system 10 is illustrated in FIG. 7.

It is to be understood that the edge refinement system 10 evaluates each of the shadow cells and highlight cells individually (i.e., one at a time). As shown in FIG. 7, when analyzing one cell, the system 10 determines if the bits assigned to that particular cell (i.e., the bit capacity) is equal to zero (see reference numeral 70). If the cell has been designated as a non-carrier (i.e., bits=0), the system 10 will move on to analyzing the next cell (see reference numeral 72). If, however, the cell has been designated as a carrier (i.e., bits=1, 2 or 3), the system 10 will recognize the carrier cell and will determine whether a predetermined edge condition is met by the carrier cell (see reference numeral 74).

Determining whether the predetermined edge condition is met may be accomplished by a number of suitable edge condition tests. In one embodiment, it is desirable to utilize a condition test that will find edges in synthetic images but not in photographically acquired images. In an embodiment, the system 10 will perform a range test to determine whether the cell then being analyzed meets the edge condition. The range test determines if a range between the lightest and darkest pixel values in the carrier cell exceeds a given threshold. The given threshold may be a default value set by the system 10, or may be a user-defined value. The then being analyzed carrier cell is determined to contain an edge if the range between the lightest and darkest pixel values exceeds the threshold. When the edge condition of the range test is not met (i.e., the dynamic range of input pixels is below the given threshold), the carrier cell is allowed to remain a carrier cell (see reference numeral 76) and the system 10 will analyze the next cell (see reference numeral 72). When the edge condition is met (i.e., the dynamic range of input pixels is above the given threshold), the system 10 will re-classify the carrier cell as a non-carrier cell. As shown at reference numeral 78 in FIG. 7, the bit capacity of the cell then being analyzed is reset to zero bits. The system 10 will then analyze the next cell (see reference numeral 72).

It is to be understood that suppressing carriers, or re-classifying carriers as non-carriers, will reduce the data carrying capacity of the data-bearing halftone image 20. In one embodiment, as the range threshold is decreased, the number of satellite clusters is decreased but the data carrying capacity is also decreased. As such, the range threshold of the range test may be adjusted in order to achieve a balance between an acceptable number of satellite clusters that are present in the data-bearing halftone image 20 and a desirable carrying capacity for the data-bearing halftone image 20.

The loss of data carrying capacity may be more severe for images 12 containing at least some photographically acquired pixels. As such, when the original image 12 includes photographically acquired pixels or a combination of photographically acquired pixels and graphic pixels, the system 10 will perform the range test and then a solid test to determine whether the cell then being analyzed meets the edge condition. In this embodiment, any carrier cells that remain carrier cells after the range test will be exposed to the solid test. The solid test exploits the fact that graphics images, such as text, have foreground or background pixels that are all the same value, while photographically acquired images typically have some small variation. The solid test involves determining if a preset minimum number of pixels in the then being analyzed carrier cell have the same value. The preset minimum may be a default value set by the system 10, or may be a user-defined value. The then being analyzed carrier cell is determined to contain an edge if at least the preset minimum number of pixels have the same value. When the edge condition for the solid test is met, the system 10 will re-classify the carrier cell as a non-carrier cell, and will reset the bit capacity to zero bits (see again reference numeral 78 of FIG. 7). The system 10 will then analyze the next cell (see reference numeral 72). When the edge condition of the solid test is not met, the carrier cell is allowed to remain a carrier cell (see reference numeral 76) and the system 10 will analyze the next cell (see reference numeral 72). It is to be understood that the solid test will eliminate almost all photo-based cells that are labeled carriers after the range test is complete.

When carrier cells are re-classified as non-carrying cells, the edge information in those cells will be rendered with a partial dot to properly reveal the edge detail and to eliminate satellite clusters that may have otherwise been associated with those cells. The goal of the edge refinement system 10 is to suppress the flattening of a cell that should be rendered as a partial dot. At least some of the advantages of the edge refinement system 10 are illustrates in the examples provided herein.

The edge refinement system 10 analyzes each of the cells in the image 12, and upon completion, some of the original carrier cells are now re-classified as non-carrier or reference cells. As such, the reference map generator 26 can change the value of those locations in the reference map 18 from a non-zero value to zero.

Referring back to FIG. 1, the reference map generator 26 can also output a carrier count 48 using the information that was used to update the reference map 18. The carrier count 48 is the total bit capacity of all carrier cells in the image 12.

The updated reference map 18 may be used by the carrier cell flattener 28 to further process the image 12. In particular, the carrier cell flattener 28 can use the updated reference map 18 and the original image 12 to identify the cells tagged as carriers. The carrier cell flattener 28 then flattens only those cells identified as carriers, leaving the non-carrier cells intact. The non-carrier cells will retain the untouched high-frequency detail that will be manifested as partial dots in the output reference halftone image 16 (and the data-bearing halftone image 20).

The reference image generator 14 also includes a halftone generator 30. The halftone generator 30 halftones the image (with the selective carrier cell regions flattened) using the threshold array 40 to produce the reference halftone 16. The reference halftone 16 includes unshifted positions of the clusters. The reference halftone 16 serves two purposes, one is for forming the data-bearing halftone image 20 and the other is for data recovery. The reference halftone image 16 may receive and carry a data payload encoded in the carrier cells. The unaltered (i.e., non-data-bearing) reference halftone image 16 can also be used as a reference for recovery of data from the data-bearing version of that image (e.g., data-bearing halftone image 20). Accordingly, more than one copy of the reference halftone 16 can be produced by the halftone generator 30 at this point in the process. In one embodiment, a portable copy of the image (e.g., a hardcopy or a digital file on removable media) can be output by the system 100 at this point.

The system 100 can further include a payload preprocessor 50 for preparing a data payload 52 to be embedded into the reference halftone 16 by the encoder 54. A principal input to the payload preprocessor is the data payload 52, which can include any type of data amenable to encoding.

The payload 52 can be subjected to no, one or more preprocessing steps before being encoded. The types of preprocessing that may be suitable or desired will depend on the type of data in the payload 52, as well as the intended use or destination of the data. Accordingly, the payload preprocessor 50 is configured to perform various processes to yield the desired data format. As one example, prevailing security protocols may require the data to be encrypted, which will impart an extra level of security to the payload contents. Encryption algorithms and techniques are common in the art, and any such approach to encrypting data that provides an output amenable to encoding may be included.

According to another embodiment, the size of the payload and/or the carrying capacity of the carrier image may make it useful to include data compression in the payload preprocessor 50.

In still another embodiment, the preprocessor 50 may include error-correction encoding. Error-correction codes are well known in the art. Particularly useful approaches to error-correction include forward error correction techniques, in which redundant bits are added to encoded data to protect against loss due to sporadic errors in transmission or decoding. One advantage of forward error correction is that errors can be detected without the need for a back-channel. For example, in certain circumstances one-pass acquisition may be one practical option in recovering the payload 52 from a hardcopy of the data-bearing halftone image 20.

The payload 52 may also be expanded to include redundancy. Recovering errors from encoded digital data in halftone clusters is similar to the error recovery process of encoding data as pits in a compact disk. The compact disk encoding standard calls for approximately triple redundancy in its error-correction encoding to achieve the desired reliability level, to compensate for the uncertainties of reading the pits and to handle anticipated scratches and other degradations. Similarly, data-bearing halftone images 20 may have uncertainties in the reading of cluster shifts and can suffer degradations by way of smudges and other deformations. In one embodiment, the desired robustness of recovery will dictate the degree of redundancy used.

As discussed above, the output of the reference map generator 26 for a given image 12 can include a carrier count 48. Together with the carrier selection rule 44, the carrier count 48 can be used to determine the size payload that the reference halftone image 16 can accommodate. As such, the reference image generator 14 as a whole can be used to create and assemble a database of reference maps 18 and carrier counts 48 for a plurality of images 12. In one embodiment, a method of selecting an appropriate reference halftone image 16 for a given payload 52 can include determining the size of the payload after any preprocessing steps, and then consulting the database for reference halftone images 16 having suitable data capacity.

An exact match between payload size and carrier capacity is not necessary (i.e., the carrying capacity may be greater than the payload). However, it may be desirable to utilize the full capacity of the carrier image to the extent possible. In one embodiment, the payload having bit counts that are shorter than the carrier count can be repeated over and over until all carrier cells are used. This approach can serve as an extra level of security, in that it can reduce the risk that damage to a portion of the image will result in loss of data. Accordingly, a particular embodiment can include embedding some number of copies of a payload in an image, where the image has a capacity that is at least that number multiple of the payload size. Conversely, in another embodiment, a data payload may be distributed among a number of carrier images, either because the data payload is too large to be accommodated by one image, or for added security.

Encoding and embedding further includes encoding the payload data into a pattern of cluster shifts and executing those shifts on the reference halftone image 16. The particular cluster shifts constituting the code are specified by the shift rule 42. Accordingly, the system 100 includes a shift list generator 56 that is configured to receive the reference map 18, shift rule 42, and payload 52 as inputs and break up the payload into data segments whose number and sizes correspond to those of the selected carrier cells designated in the reference map 18 (the updated version after edge refinement takes place).

The shift list generator 56 uses the reference map 18 to determine the order of carrier cells in the map 18 as well as the bit capacity of each cell. The shift list generator 56 then breaks the payload into segments of n bits according to the current carrier cell, where n is the bit capacity of that cell. The shift list generator 56 uses the shift rule 58 to assign a particular cluster shift to each data segment. The shifts to be executed to encode a given payload are listed in a shift list 58. The shift list 58 is a principal output of the shift list generator 56. The shift list 58 can also include designations of unshifted cells to serve as marker cells in the bit stream, e.g., to separate two iterations of the payload data, or to signify the end of the data to be encoded.

The reference halftone image 16 is then subjected to the shift-based encoding. In one embodiment, an encoder 54 receives the shift list 58 and the reference halftone image 16 as input and executes the shifts designated in the shift list 58 to generate the data-bearing halftone image 16. More specifically, the shift list provides the encoder with instructions as to which carrier cell clusters to shift and in which direction to shift those clusters. Cluster shifting can be executed until the complete payload is embedded at least once or until the available carrier cells are exhausted. As discussed above, marker cells in the data-bearing halftone image 20 can be indicated by unshifted carrier cells to assist in recovery.

In one embodiment, the various operations of payload encoding can operate in sequence with operations of the reference image generator 14. In an alternate embodiment, the various operations of payload encoding can be carried out in parallel with the operations of the reference image generator 14.

Once the data payload 52 is embedded in the reference halftone image 16, the data-bearing halftone image 20 can be output in some form. The form of the output may depend upon the intended recipient. In one embodiment, the data-bearing halftone image 20 is provided as a hardcopy printed on a suitable output device 60 (e.g., a printer). The hardcopy image may be a standalone product or may be incorporated into a product that includes one or more images, such as a document or a label. The cluster shifting process can constitute one of the final steps in an overall process of rendering of the image 20 by the output device 60.

Embodiments disclosed herein can include processes for recovering the data payload 52 from the data-bearing halftone image 20. The method of recovery will depend to a degree on the format in which the data-bearing image 20 is provided. The discussion of recovery will be directed mostly to approaches typically used on print images. However, those skilled in the art will recognize that the principles discussed herein can be adapted to deal with other formats, such as digital files.

The steps involved in recovering and decoding data will be determined to an extent by the manipulations made in creating the halftone image 16 and in encoding the data. To facilitate recovery, certain information, processes, and outputs can be made available to the recovery process. This symmetrical aspect can be enhanced by incorporating certain components in both systems (i.e., the system 100 and a recovery system). In one embodiment, image generation, data encoding, and recovery may be incorporated into in a single device that can be used by both sender and recipient of the data. In another embodiment, both sender and receiver can have access to certain information (e.g., reference map 18, shift rule 42, reference halftone image 16) in a form that can be uploaded to an existing device.

According to a general embodiment, the data-bearing halftone image 20 can be input into a recovery system (not shown), the cells of the image 20 can be aligned using, in part, the reference halftone 16 and the reference map 18, and carrier cells can be identified by referring to the reference map 18. The payload encoded therein can then be extracted. In one embodiment, the reference map 18 can be imported into the system at the time of recovery. Alternatively, the reference map 18 can be made available in a database comprising reference maps for a number of carrier images. These carrier images can have been mutually designated for use by both the sending party and the recipient.

In one embodiment, the recovery system can refer to the reference map 18 to ascertain the location of the carrier cells. Then the system can assess the cluster position in each carrier cell in the data-bearing image 20 as compared to the corresponding cell in the reference halftone image 16. Where a difference of cluster position is detected, the value of the shift direction can be ascertained by reference to the shift rule 42. In this way, the data segments of the payload 52 can be decoded and reassembled to recover the payload 52.

Recovery of embedded code in a data-bearing halftone image 20 can be complicated by the approach used to scan the image and the limitations of the particular device. For example, scanning a printed image can raise a host of issues, arising both from the printer (e.g., dot gain, black-white non-linearities) and the scanning device (e.g., positioning, alignment, scaling, zooming, etc.). The presence of non-carrier (reference) cells can be used by the recovery system to calibrate the acquired data-bearing image 20 against the reference map 18 and the reference halftone image 16.

To further illustrate embodiment(s) of the present disclosure, examples are given herein. It is to be understood that these examples are provided for illustrative purposes and are not to be construed as limiting the scope of the disclosed embodiment(s).

EXAMPLES

Figure 9:
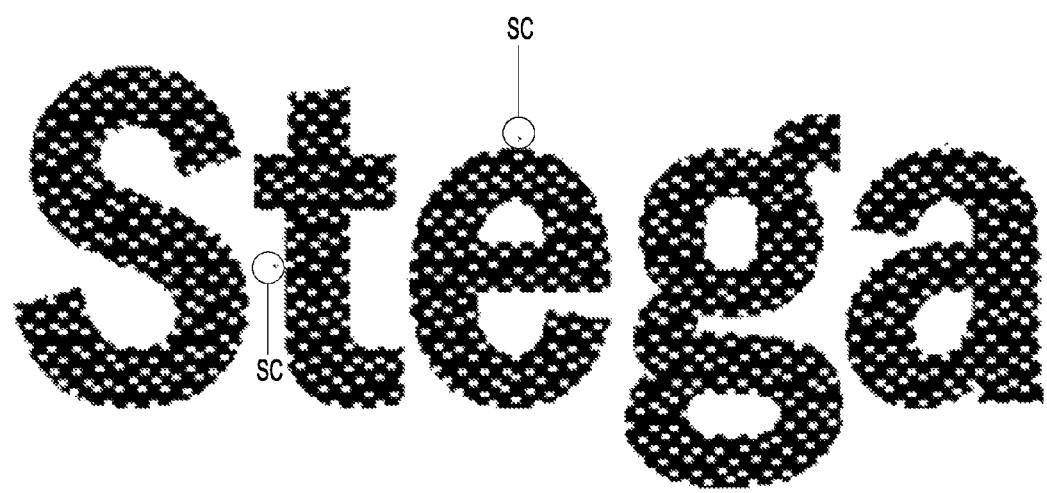
FIG. 9 is an enlarged portion of a data-bearing halftone image formed using the image of FIG. 2, and with edge refinement including a range test with the threshold set at 0.25.
Figure 10:
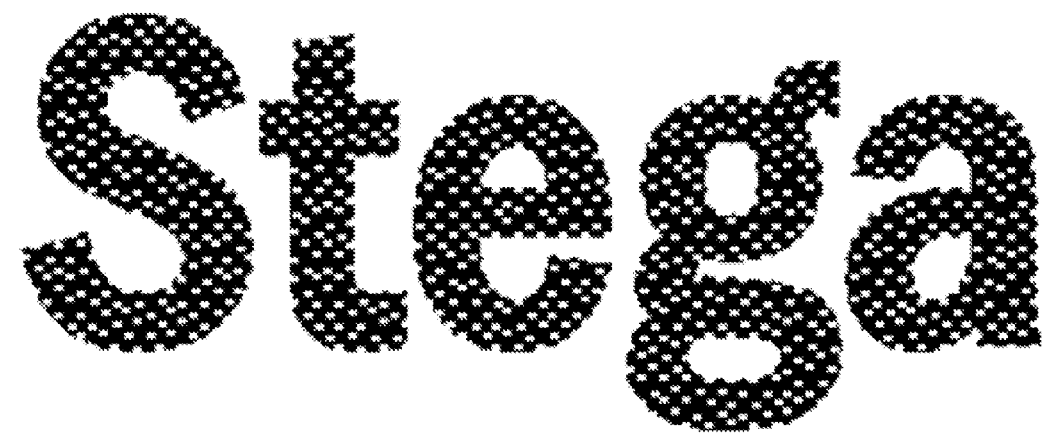

In the following comparative examples and examples, a graphic image, which is shown in FIG. 2, was used to generate data-bearing halftone images. FIGS. 8 through 10 illustrate a portion of some of the data-bearing halftone images that were generated. These Figures illustrate the respective portions of the data-bearing halftone images at eleven times the actual image size.

Comparative Example

A comparative data-bearing halftone image was created using the image shown in FIG. 2 as the original image 12 in the system depicted in FIG. 1. During creation, some 4×4 pixel cells that partially covered a small portion of the gray text had an average value that was identified to be suitable as a carrier cell. The edge refinement process disclosed herein was not performed during the creation of this data-bearing halftone image (i.e., the edge refinement system 10 in FIG. 1 was not used). Due to the cell flattening, the identified carrier cells were halftoned with a cluster close to the center of the cell, which appear to float off the edge of the text (i.e., satellite clusters).

Because the edge refinement system disclosed herein was not used, the resulting comparative data-bearing halftone image 20, as illustrated in FIG. 8, had numerous satellite clusters (labeled SC) around the edges of the characters. At real size, the satellite clusters SC have the visual effect of fuzziness and a lack of crispness at the edges.

Example 1

A data-bearing halftone image was created using the image shown in FIG. 2. The data-bearing halftone image was created as described in the comparative example, except that edge refinement was performed. In this example, the edge refinement system performed the range test. Edges were identified when the range between the lightest and darkest pixels values in the respective cells exceeded 0.25, 0.13, and 0.06, where the difference between white and black was 1.0.

FIG. 9 illustrates a portion of the data-bearing halftone image formed with the range threshold set at 0.25, and FIG. 10 illustrates a portion of the data-bearing image formed with the range threshold set at 0.06. As illustrated in FIG. 9, almost all of the satellite clusters SC of the comparative example are eliminated, with the exception of a few, and the satellite clusters SC remaining in FIG. 9 are removed when the threshold range is lowered to 0.06, as shown in FIG. 10.

To examine the data carrying consequences on a photographically acquired original image using the method described in the Comparative Example and the method described in this example, a 600×600 photo was also used as an original image 12 to generate data-bearing halftone images. The loss of data carrying capacity was calculated for both the data-bearing halftone images generated using FIG. 2 and the photograph. Table 2 shows the data carrying capacity of the images when edge refinement is not performed, and also shows the effect that the range edge criterion had on reducing carrier bits for these two images when the different range thresholds were used.

TABLE 2

| Range Threshold | Edge Noise | Data Carrying Capacity (bits) | | | |
|---|---|---|---|---|---|
| | | logo | | photo | |
| No edge refinement | Severe (see, e.g., FIG. 8) | 4401 | 100% | 18961 | 100% |
| 0.25 | Improved (see, e.g., FIG. 9) | 3717 | 84% | 17078 | 90% |
| 0.13 | Improved | 3655 | 83% | 14166 | 75% |
| 0.06 | Absent (see, e.g., FIG. 10) | 3584 | 81% | 11419 | 60% |

It was noted that the loss in data carrying capacity was about 40% for the photograph when the range test threshold was set at 0.06.

Example 2

The same processes described above for both generating data-bearing halftone images for FIG. 2 and the photograph were repeated with the addition of the solid test in the edge refinement system. After the range test was performed, the edges were further identified when at least a minimum number of pixels in the cell had the same value. The minimum number of pixels for the solid test was set at 5 and then at 8.

Table 3 shows the data carrying capacity of the images when edge refinement is not performed, and also shows the effect that the range edge criterion and solid edge criterion had on reducing carrier bits for the two images.

TABLE 3

| Range Threshold | Minimum # of pixels for Solids Test | Data Carrying Capacity (bits) | | | |
|---|---|---|---|---|---|
| | | logo | | photo | |
| No edge refinement | No edge refinement | 4401 | 100% | 18961 | 100% |
| 0.25 | 5 | 3717 | 84% | 18961 | 100% |
| 0.13 | 5 | 3655 | 83% | 18931 | 99% |
| 0.06 | 5 | 3584 | 81% | 18826 | 99% |
| 0.25 | 8 | 3720 | 84% | 18961 | 100% |
| 0.13 | 8 | 3658 | 83% | 18961 | 100% |
| 0.06 | 8 | 3587 | 81% | 18961 | 100% |

As illustrated in Table 3, the combination of the range test and the solid test will preserve almost all, if not all, carrier cells in the data-bearing image generated using the photograph, while effectively preserving edges in the data-bearing image generated using FIG. 2. The output of the data-bearing halftone image for the logo image (FIG. 2) (shown in FIG. 9 and FIG. 10) appeared essentially the same with or without the solid test. When the value of the solid test was increased to 8, there was zero loss of capacity for the photo with small difference in the graphic image.

As discussed herein and as illustrated in the various examples, embodiments of the edge refinement system 10 disclosed herein improve the quality of the data-bearing halftone images 20 with minimal cost to the data carrying capacity. The system 10 can be used to improve data-bearing halftone images 20 formed from graphic images containing text, solid backgrounds, synthetic graphics, etc.), and from hybrid images containing both text/graphics and photographic image pixels.

While several embodiments have been described in detail, it will be apparent to those skilled in the art that the disclosed embodiments may be modified. Therefore, the foregoing description is to be considered non-limiting.

What is claimed is:

1. An edge refinement system, comprising a non-transitory computer-readable medium encoded with a computer program having:
   computer readable code for identifying carrier cells among shadow cells and highlight cells of a segmented image;
   computer readable code for determining if a predetermined edge condition is met by each of the identified carrier cells, the computer readable code for determining including:
      computer readable code for performing a range test, the computer readable code for performing the range test including computer readable code for determining if a range between a lightest pixel value and a darkest pixel value in a respective one of the identified carrier cells exceeds a given threshold; and
      computer readable code for performing a solid test on the respective one of the identified carrier cells having been subjected to the range test and remaining a carrier cell based on the range test, the computer readable code for performing the solid test including computer readable code for recognizing the predetermined edge condition when a preset minimum number of pixels in the respective one of the identified carrier cells have a same value; and
   computer readable code for re-classifying the carrier cell as a non-carrier cell when the predetermined edge condition is met;
   wherein the system further includes memory and a processor operatively coupled to the memory and to the non-transitory computer-readable medium.

2. The edge refinement system as defined in claim 1 wherein the computer readable code for performing the range test is initiated when the segmented image contains graphic pixels.

3. The edge refinement system as defined in claim 1 wherein the computer readable code for performing the range test and the solid test is initiated when the segmented image contains photographically acquired pixels or a combination of graphic pixels and photographically acquired pixels.

4. The edge refinement system as defined in claim 1 wherein the edge refinement system is a sub-system of a reference map generator, and wherein the reference map generator further includes a second sub-system that segments an image into the shadow cells and the highlight cells, and determines a number of bits that can be input into each of the shadow cells and highlight cells.

5. A system for creating a data-bearing halftone image, comprising:
   an image preprocessor;
   a cell flattener;

a reference map generator, including:
- a sub-system that segments an image into shadow cells and highlight cells, and determines a number of bits that can be input into each of the shadow cells and highlight cells; and
- an edge refinement system that evaluates the carrier cell, determines if a predetermined edge condition is met by carrier cell, and re-classifies the carrier cell as a non-carrier cell when the predetermined edge condition is met, the edge refinement system including:
  - computer readable code, embodied on a non-transitory computer-readable medium, for performing a range test, the computer readable code for performing the range test including computer readable code for determining if a range between a lightest pixel value and a darkest pixel value in a respective one of the identified carrier cells exceeds a given threshold; and
  - computer readable code, embodied on the non-transitory computer-readable medium, for performing a solid test on the respective one of the identified carrier cells having been subjected to the range test and remaining a carrier cell based on the range test, the computer readable code for performing the solid test including computer readable code for recognizing the predetermined edge condition when a preset minimum number of pixels in the respective one of the identified carrier cells have a same value;
- a carrier cell flattener; and
- a halftone generator.

6. The system as defined in claim 5, further comprising:
- a payload encoder for segmenting a data payload into a plurality of data segments, and for encoding the data segments into one of the carrier cells by shifting a pixel cluster an allowed shift positions to produce the data-bearing halftone image; and
- an output device for outputting the data-bearing halftone image.

7. The system as defined in claim 5, further comprising the image which includes graphic pixels, photographically acquired pixels, or combinations thereof.

8. The system as defined in claim 7 wherein the edge refinement system determines if the predetermined edge condition is met by performing the range test when the image contains the graphic pixels, or by performing the range test and the solid test when the image contains the photographically acquired pixels or the combination of graphic pixels and photographically acquired pixels.

9. A method for refining an edge of a data-bearing halftone image, comprising:
- identifying a carrier cell;
- performing an edge condition test on the carrier cell to determine if a predetermined edge condition is met, the edge condition test including:
  - performing a range test to determine if a range between a lightest pixel value and a darkest pixel value in the carrier cell exceeds a given threshold; and
  - performing a solid test on the carrier cell after it has been subjected to the range test and is characterized as a carrier cell based on the range test, the solid test including recognizing the predetermined edge condition when a preset minimum number of pixels in the identified carrier cell have a same value; and
- one of:
  - re-classifying the carrier cell as a non-carrier cell when the predetermined edge condition is met; or
  - allowing the carrier cell to remain the carrier cell when the predetermined edge condition is not met.

10. The method as defined in claim 9 wherein:
- prior to identifying the carrier cell, the method further comprises applying a halftone screen to an image, thereby segmenting the image into highlight cells and shadow cells;
- the identifying of the carrier cell is accomplished by:
  - identifying an available pixel shift position for a pixel cluster within each shadow cell and within each highlight cell of the image; and
  - defining the carrier cell as any of i) a respective shadow cell having room for the pixel cluster to move at least two single pixel shift positions within the respective shadow cell, or ii) a respective highlight cell having room for the pixel cluster to move at least two single pixel shift positions within the respective highlight cell;
- the method further comprises generating a bit capacity for each of the highlight cells and shadow cells based on a number of the available pixel shift positions for the pixel clusters of the respective cells; and
- the identifying of the carrier cell further includes determining which highlight cells and shadow cells have a bit capacity greater than zero.

11. The method as defined in claim 10, further comprising accomplishing the identifying, performing, and one of re-classifying or allowing steps for each carrier cell in the segmented image.

12. The method as defined in claim 11, further comprising:
- flattening any remaining carrier cells, thereby leaving any non-carrier cells intact; and
- halftoning the segmented image to generate a reference halftone.

13. The method as defined in claim 12, further comprising:
- segmenting a data payload into a plurality of data segments;
- encoding the data segments into respective carrier cells by shifting the pixel clusters of the carrier cells to one of the available shift positions to produce the data-bearing halftone image; and
- rendering the data-bearing halftone image with an output device.

14. The method as defined in claim 9 wherein re-classifying the carrier cell as the non-carrier cell when the predetermined edge condition is met suppresses flattening of the non-carrier cell so that it can be rendered as a partial dot.

15. The system as defined in claim 5 wherein the sub-system further:
- identifies an available pixel shift position for a pixel cluster within each of the shadow cells and within each of the highlight cells; and
- defines a carrier cell as any of i) a respective shadow cell having room for the pixel cluster to move at least two single pixel shift positions within the respective shadow cell, or ii) a respective highlight cell having room for the pixel cluster to move at least two single pixel shift positions within the respective highlight cell.

* * * * *